United States Patent [19]
Davis

[11] Patent Number: 5,262,879
[45] Date of Patent: Nov. 16, 1993

[54] HOLOGRAPHIC IMAGE CONVERSION METHOD FOR MAKING A CONTROLLED HOLOGRAPHIC GRATING

[75] Inventor: Frank S. Davis, Houston, Tex.
[73] Assignee: Dimensional Arts. Inc., Houston, Tex.
[21] Appl. No.: 220,080
[22] Filed: Jul. 18, 1988
[51] Int. Cl.$^5$ .............................. G03H 1/10; G03H 1/26
[52] U.S. Cl. ........................................ 359/10; 359/11; 359/22; 359/28; 359/900
[58] Field of Search ..................... 350/3.67, 3.76, 3.84, 350/3.85, 3.66; 356/402, 406; 355/2; 283/86; 359/9, 10, 11, 17, 21, 22, 23, 28, 900, 24, 25

[56] References Cited

U.S. PATENT DOCUMENTS

| | | | |
|---|---|---|---|
| 3,537,854 | 11/1970 | Grobin, Jr. et al. | 350/3,77 |
| 3,560,071 | 2/1971 | Silverman et al. | 350/3.67 |
| 3,615,123 | 10/1971 | Wuerker | 350/3.77 |
| 3,832,027 | 8/1974 | King | 350/3.85 |
| 3,975,081 | 8/1976 | Kato et al. | 350/3.73 |
| 4,111,519 | 9/1978 | Gillis et al. | 350/3.66 |
| 4,212,536 | 7/1980 | Bencze et al. | 350/3.83 |
| 4,430,668 | 2/1984 | Miles, Jr. | 358/75 |
| 4,498,729 | 2/1985 | Benton | 350/3.85 |
| 4,498,740 | 2/1985 | Caulfield | 350/3.66 |
| 4,655,542 | 4/1987 | Dube | 350/3.6 |
| 4,754,487 | 6/1988 | Newmuis | 382/56 |
| 4,778,262 | 10/1988 | Haines | 350/3.85 |

FOREIGN PATENT DOCUMENTS

| | | | |
|---|---|---|---|
| 0088779 | 5/1984 | Japan | 350/3.67 |
| 8400070 | 1/1984 | World Int. Prop. O. | 350/3.66 |

OTHER PUBLICATIONS

Nakajima et al., "Computer-Generated Polarization Holography: Auotmatic Hologram Making System and the Quality of the Reconstructed Image"; Proceedings of ICO-11 Conference, Madrid, Spain, 1978, pp. 407-410.

Nagashima et al; "Computer Generated Line Holograms Using an xy Plotter" 1983 Butterworth & Co. Ltd.

Hsueh et al; "Computer-Generated Double-Phase Holgrams"; Applied Optics; vol. 17, No. 24, Dec. 1978, pp. 3874-3883.

*Primary Examiner*—Bruce Y. Arnold
*Assistant Examiner*—R. D. Shafer
*Attorney, Agent, or Firm*—Lowe, Price, LeBlanc & Becker

[57] ABSTRACT

A method for converting a 2-D image into a hologram is set forth. An optical scanner system which measures the primary color intensity of a selected pixel and forms an indication thereof is disclosed. The location of the pixel is output as XY coordinate data. The location and color data is stored in memory, and the memory is thereafter retrieved. A pixel is located on a blank, and a laser beam split into four equal segments is focused along four separate pathways to the pixel location. Interference fringes formed at the point of convergence on the blank enables transfer of a single pixel, and multiple pixels are transferred so that the entire image is reproduced.

18 Claims, 2 Drawing Sheets

HOLOGRAPHIC IMAGE CONVERSION METHOD FOR MAKING A CONTROLLED HOLOGRAPHIC GRATING

BACKGROUND OF THE DISCLOSURE

Holographic gratings are extremely attractive for fabrication of tamper-proof or secure credit cards. Other documents are protected by incorporating a holographic grating in them for other security reasons. The present apparatus and method disclose a procedure and mechanism for forming one or more gratings so mass production from a master grating is possible.

One example of a procedure for conversion of a photograph into a hologram is set forth in U.S. Pat. No. 3,832,027. This describes a procedure which converts a two dimension photograph into a hologram. It is, however, accomplished with computer data processing to convert the photographic symbol or image from the photograph into a hologram. Multiple views are aggregated to provide the ultimate representation. The present apparatus is able to form a holographic grating (a representation appearing to have depth when viewed in conventional illumination and which is described hereinafter as a hologram or holographic grating).

Background is given in an article entitled "Diffraction Gratings" at page E-29 of the 1984 Edition of the "The Optical Industry and Systems Purchasing Directory". It describes making holographic gratings by permitting two beams of coherent monochromatic light to form grating interference fringes in a photosensitive material. The interference fringes are formed where the two coherent beams come together and overlapping beams, valleys and peaks interfere with one another for periodic cancellation. This defines interference fringes, enabling marked lines on the material. A grating is normally described by the spacing of grooves in the grating, it being possible to obtain upwards of 6,000 grooves per millimeter, and the gratings can be as large as 400 by 600 millimeters. In fact, the present means and method enable fabrication of a substantially unlimited size grating. The inventive method takes advantage of the interference pattern between the pair of interfering coherent beams (from a common laser source) which enables the interference fringes to be controlled. The present approach utilizes a photosensitive layer on a substrate as an initial blank surface. The layer is aphotosensitive material, normally a photoresist used routinely for semiconductor fabrication. One approach in the procedure is to form an image on a surface, namely as an image to be converted into a hologram. The term hologram refers to the grating which serves as a reflective diffraction grating or a transparency and further contemplates an image which appears to have 3-D depth when viewed in typical ambient lighting conditions. Thus, the term "image" refers to the symbol or object which is first provided in a 2-D depiction. This 2-D image is then converted into a 3-D hologram by the present process. Sequentially, the image is first photographed or otherwise formed into a 2-D format. It is perfectly acceptable to use 2-D photographs or, alternatively, to draw or sketch the image with suitable color contrasts. It is first scaled to the desired size. A 1:1 conversion from 2-D image to hologram is an example. The scale of a 2-D image can be varied by well known photographic processes. The image is therefore scaled to the desired size and is provided with the desired color scheme. After the image has been scaled and has the desired colors in it, it is next scanned with an XY drive system which breaks the image area into a number of pixels. Pixel size depends on the resolution (or fineness) of the system. A pixel is thus defined as the smallest unit at a location on X and Y coordinates which is to be encoded for formation of a set of code words representing the pixels which make up the XY description of the image. The scanning routine in X and Y dimensions increments at a specified spacing to hereby form a pixel at every XY intersection of the coordinate system. At each pixel, a small colored dot is defined which can be expressed in terms of optical density (a scale between total black and total white with shades of grey between) and also the three primary colors of red, green and blue. Thus, an image is divided into a multitude of equal size pixels which are evaluated for optical density and these values are then converted into suitable digital words representative of the measurements. Separately, an XY coordinate drive system locates each particular pixel. Values for X and Y are assigned on operation of the drive system and such representations are likewise formed into digital words. The individual pixel is thus represented by several data words including X and Y locations, color in the form of primary color representations and optical density. This set of data associated with an individual pixel is then recorded.

At the time of retrieval of the data representative of the individual pixel, the X and Y pixel location data is used to position a photosensitive blank driven by an XY drive system. A laser beam emitted through a shutter defines the size of the pixel on the blank, and defines a reference beam which illuminates the pixel area of the blank to develop the interference fringes which have the form of rulings on a grating in the customized diffraction grating. The reference beam is broken into four equal portions by beam splitters and three of the portions are directed from different directions to the same location on the blank. The reference beam has an exposure time arbitrarily described as 99 units duration. The three beams are directed onto the target from other angles as will be described, each persisting for an interval of up to 33 units. Each of the three beams (being equal in intensity) is assigned a ratio depending on the portion of the primary colors found in the pixel. The beams are modulated and thereby form interference fringes at the pixel to shape the rulings on the gratings. In conclusion, this forms interference fringes which are specially adapted to refract in proportion the three primary colors and therefore complete the pixel. The entire image is painted on the blank as a multitude of pixels located in the XY coordinate system to preserve and transfer the image, thereby forming a hologram on the blank. After the blank has been fully exposed, it can then be used as a master for fabrication of a multitude of replicated holograms made from the photoresist blank.

The structure of the present apparatus incorporates an XY drive system for moving a photoresist blank in front of, and at a controlled distance from a laser source along with a set of mirrors and beam splitters so that four beams are directed to a common pixel location at specified angles of convergence. This forms the individual pixel in the photoresist blank at each pixel location. The system further includes an image scanner which converts any 2-D image into the data necessary to make a hologram, the system including an XY drive system, an optical system scaled to view the defined pixel area, appropriate color filters and color density measuring apparatus. The data from the multiple measurements for each pixel are converted into digital words.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENT

Figure 1:
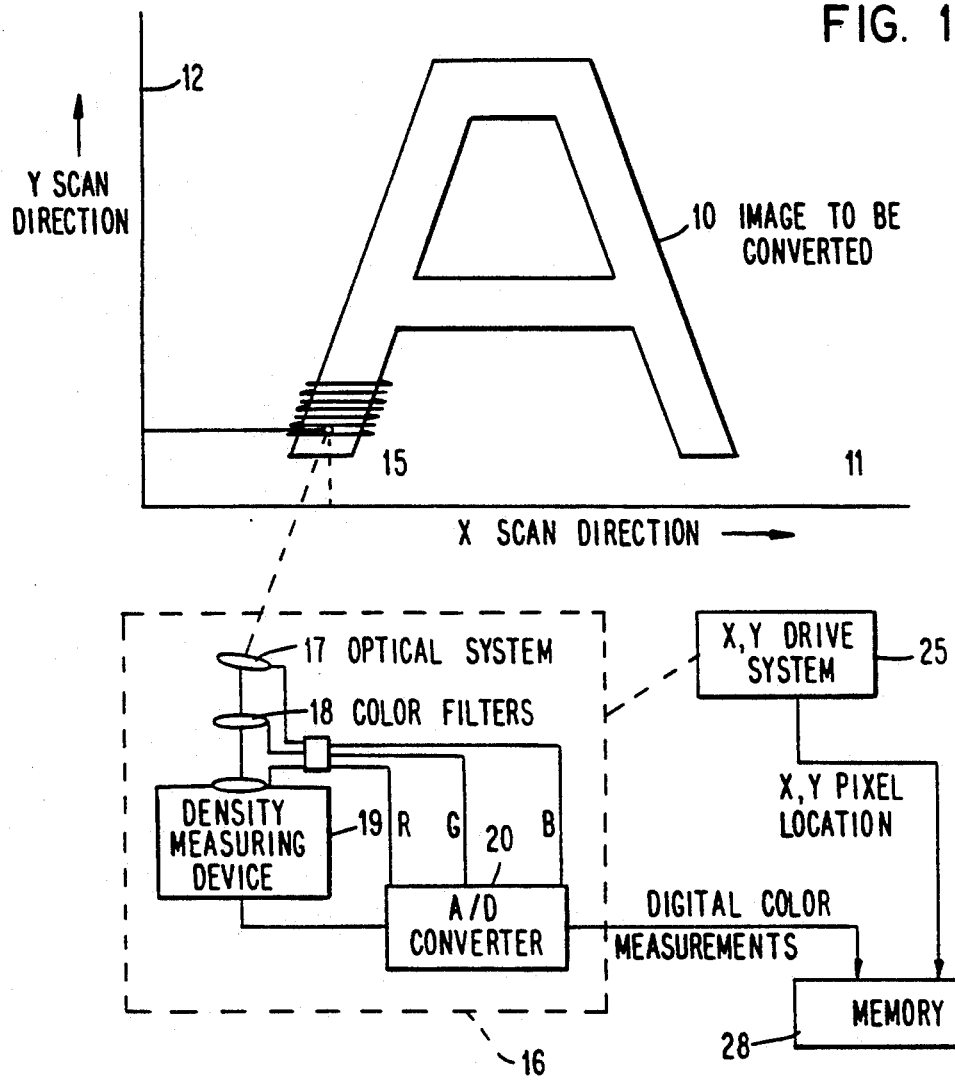
FIG. 1 shows a representative image converted by the apparatus shown therein including an XY drive system and appropriate optical measuring apparatus.

Attention is first directed to FIG. 1 of the drawings for a description of the apparatus shown which will serve as a predicate for description of the method of the present invention. The numeral 10 identifies the letter A which is a 2-D image which will be converted into a hologram. Obviously, other images can be used, and the letter A has been chosen to serve as a representative image. The image is a photograph, or is drawn. Also, it can be computer generated and written on a surface, has the illustrated shape. It is located in a field of view defined by X and Y dimensions. To this end, there is an X scan direction indicated by the appropriate ordinate 11 and a suitable Y ordinate 12. Locations in this field are identified by uniformly measured increments such as pixel spacings of 1 mm. Obviously, this is a scale factor and can be varied as required. It would It would not be uncommon to use a pixel as small as 0.1 mm and to this end, the image 10 must fit within the maximum scale values permitted for X and Y. For arbitrary descriptive purposes, assume that X and Y can have values of 10,000 units where the units are equal in X and Y dimensions. An individual pixel is represented at 15, and is located by scanning from the XY origin so that representative measurements are obtained for both X and Y. The pixel 15 location is represented by two positive integers where the units of measure are uniform in the two dimensions.

The image 10 is mounted on a fixed plane which is perpendicular to an optical measuring system. The optical measuring system is that apparatus which is enclosed within the dotted line 16. The optical measuring system incorporates appropriate optical apparatus 17 which focuses on the pixel 15. It is sized so that it looks at the pixel area 15. Moreover, the reflected light from the pixel 15 is directed through a set of color filters 18 which direct the beam to a density measuring device 19. In turn, that provides a measurement which typically is analog form and is input to an A/D converter 20 for conversion to a digital word.

The pixel 15 is located by the optical system 16 which is driven by an XY drive system 25. The drive system incrementally advances the optical system to scan the image 10 pixel by pixel. The drive system is able to scan the entire XY area where the image 10 is located within specified limits. Thus, it is able to incrementally advance from the origin to the maximum distance along the two axes. As it operates, it forms two digital words which are representative of the X and Y pixel location. This can be achieved in a variety of ways. For instance, beginning at the origin (both values are zero), the drive system can measure each step. For instance, the several lines shown in FIG. 1 show movement of the XY drive system as it relocates the means 16 in a steady progression across the image area, stopping at each advance to make a new measurement. If this is accomplished in a row or column fashion, the X or Y dimension is held fixed while incremental advancing across the entire image area is accomplished. In one procedure the Y dimension is fixed while the X dimension is incremented from minimum to the maximum.

There are areas of the image 10 where there is no data. That is, no data is required when the pixel is located off the image 10. The system can drive the pixel location to the edge of the image 10, and at the edge, as soon as a zero reading is determined, the Y dimension can be incremented to shift away from the zero data point. Alternately, a total scan of the entire permissible area can be undertaken even though many pixels will have zero readings. The converter 20 and the drive system 25 form output signals which are supplied to a memory 28. The memory preferably is a permanent media such as magnetic tape or the like. The data associated with the pixel 15 includes location and optical values. Specifically, the pixel 15 is located relative to the origin by data words representative of X and Y location. This can be an absolute measure from the origin or it can be an incremented measure from the previous pixel. Assuming that the permissible image field is 100,000 increments in both dimensions, the values for X and Y can be any integer between zero and 100,000, obviously, represented in appropriate digital code. The converter 20 provides appropriate digital words for the color of the pixel. One word represents the optical density between black and white, a typical grey value. This can be represented in a number of levels of intensity such as 64 levels of intensity ranging from complete whiteness to total blackness. The digital word in that instance would have 64 values, and obviously can be increased to 128 or 256. Optical density measuring devices are known which represent the black/white scale in a range of zero to 4.00. The color filters 18 are removed to obtain the density value. Thereafter, the color filters are inserted in some known sequence, the preferred sequence being red, green and blue. The red filter is inserted and the red value is then measured. Again, this is accomplished for the green and blue values. This causes the equipment to generate a total of four words for the pixel. The last three words have gradations which are on any suitable scale. As an example, sixteen levels of color can be chosen. Also, classic color analysis prevails where purple is represented by equal mixes of red and blue. Thus, the red and blue digital words representative of red and blue optical density are output with the data to the memory 28 to obtain purple. In sum, the pixel 15 is described with two digital words representing location and four digital words representing color, one being a grey density reading and the other being the three primary colors.

Figure 2:
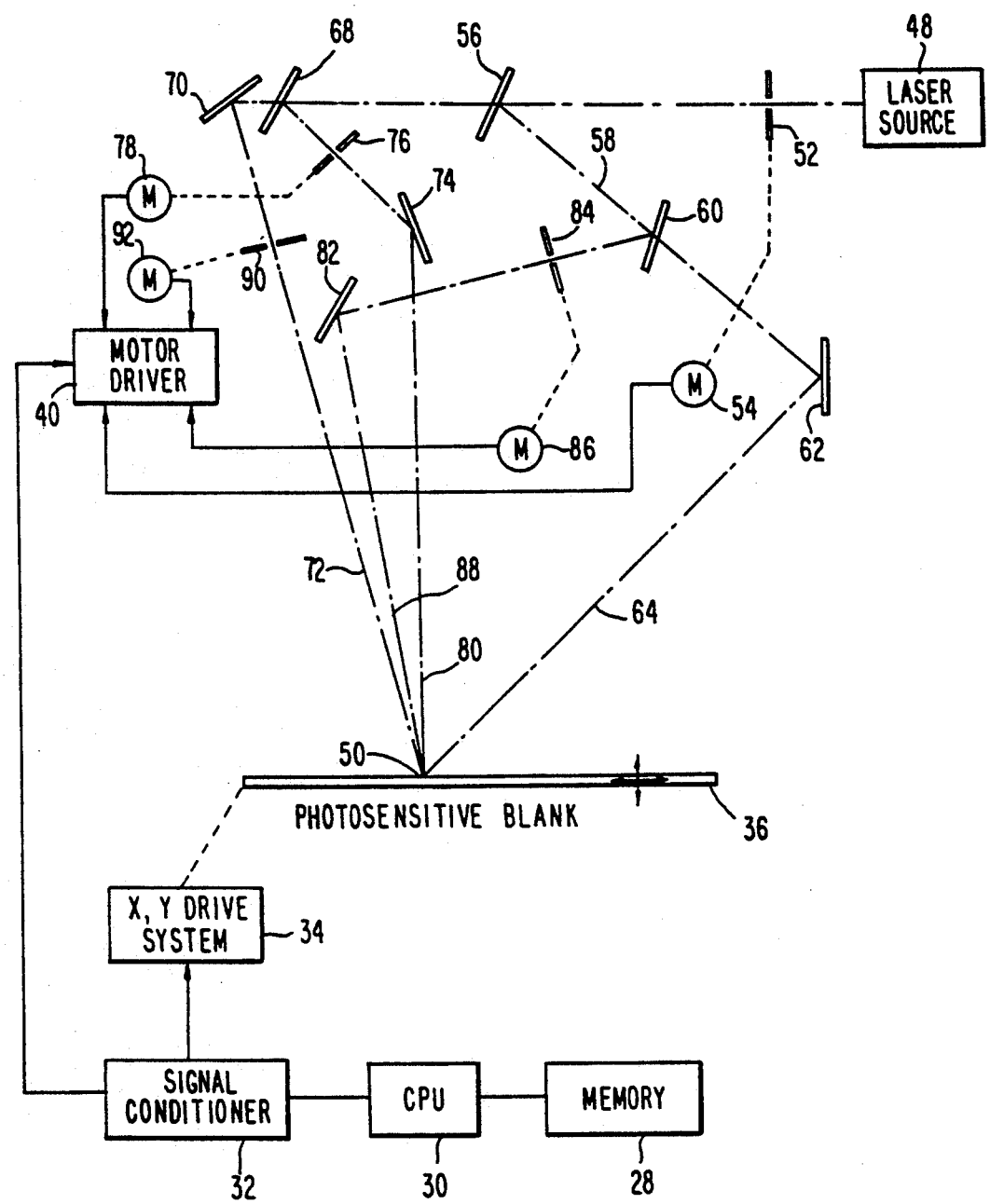
FIG. 2 is a schematic optical pathway utilizing a laser source and a photosensitive blank which is operated by appropriate drive systems in response to the image stored from the 2-D image of FIG. 1.

The memory 28 is loaded to represent the image 10. Thereafter, the information in memory can be converted to form the hologram. Attention is directed to FIG. 2 of the drawings for this. The memory 28 again is shown in FIG. 2. It should be kept in mind that the memory can be a typical magnetic tape on which data is recorded and which is played back on a typical magnetic tape transport system. This data is recovered for a CPU 30 and then is output to a signal conditioner 32. The signal conditioner forms signals of suitable amplitude and current flow to drive the equipment as required. The signal conditioner forms X and Y drive signals for the XY drive system 34. These signals are input to appropriate stepping motors which move and reposition a blank 36 of some sensitive material such as a photoresist. The blank 36 is incrementally moved by increments having equal measure in the X and Y dimensions. Here, a scale factor can be applied between the recorded data and the playback data. Assume in FIG. 1 of the drawings that the image 10 is small and is to be expanded by ten-fold when converted to a hologram. In that instance, the increments of movement for the photosensitive blank are ten times greater than the increments of movement associated with the image 10 when first converted into data for memory 28. If the increments of movement in FIG. 1 are 0.1 mm, than the incremental movement in FIG. 2 is 1.0 mm, namely movement of the photoresist blank by increments of this size. This scale factor can be conveniently incorporated in the CPU 30 so that the hologram formed is scaled to the desired size. If the increments of movement are ten times larger, then the pixel diameter must be larger. The beam which focuses on the pixel 15 shown in FIG. 1 is a circular dot of a certain diameter; this dot is made approximately ten fold larger for the enlargement obtained from the blank 36. Enlargement should size the dot formed on the blank so that the respective dots touch one another but do not overlap. The signal conditioner provides the appropriate driving signals which may be of greater than signal amplitude for the XY drive system 34. Likewise, it provides suitable motor drive signals for the various shutters as will be described. This output signal is sent to the motor driver 40 as will be described.

A laser source 48 forms a CW laser beam of specified frequency. The beam passes through various shutters, beam splitters and mirrors to arrive at a pixel location 50 on the blank 36. The four pathways to be described are equal in length. Thus, the beam, split into four parts, arrives at the pixel 50 with the four split beams synchronized. The laser beam forms the coherent light waves which, even after splitting, arrive with substantial coherence. If for instance the beam is vertically polarized at the laser 48, it remains vertically polarized at the pixel 50. Moreover, it is coherent in that the four signal paths are ideally equal in length. The significance of this will be described later.

The beam passes through a master shutter 52 which is operated by a suitable motor 54. The motor is driven by the driver 40 and permits the beam to pass through the shutter for a controllable interval. The shutter has an aperture for the beam where diameter is related to the size of the pixel 50. This aperture can be changed in size. The unsplit beam is directed to a beam splitter 56 and is divided into two equal portions. One portion is reflected along the pathway segment 58 and is directed to another beam splitter 60. All the beam splitters described herein provide 50% reflection and 50% transmission. This assures that the single beam is split into four equal beam intensities. The beam splitter 60 permits the transmitted segment to travel to a mirror 62 and the beam pathway 64 is directed to the pixel 50. This is the reference beam as will be defined in detail.

Another beam splitter 68 is included. It permits a portion of the beam to pass through to a mirror 70. The mirror 70 directs a second beam 72 to the pixel 50. The beam splitter 68 directs the beam to another mirror 74. This beam must pass through a shutter 76 which is opened and closed in response to a motor 78. This controllably modulates the beam in an off/on fashion along the pathway 80. This beam is directed to the pixel 50. The apparatus also includes another mirror 82 which reflects the beam from the mirror 60. This beam passes through a shutter 84 which is driven by a suitable motor 86. This modulates the beam which is directed along the pathway 88 to the pixel. Recall also that the beam 72 passes through a shutter 90 which is controlled by a motor 92. The four motors are driven by the motor driver to operate the four respective shutters. The four shutters are identical in construction and the motors which drive them are also identical. They differ in location and will be labeled accordingly. The master shutter 52 provides control over all beam transmission. The pathway 64 delivers the reference beam. The pathway 72 delivers the blue beam. This is, however, not a change in the color of the beam. It is modulated by the blue shutter 90. Again, no color change occurs in the beam; it will be described as the blue beam for reasons made clear hereinafter. Likewise, the beam traveling along the pathway 80 is the red beam, while the pathway 88 is the path of the green beam. All four pathways converge at the pixel 50 and overlay one another so that all four dots on the blank are equal in diameter, have a common polarization, and are coherent. The pathways for the four beams are equal in length to assist in interference pattern formation from the coherent beams.

Figure 3:
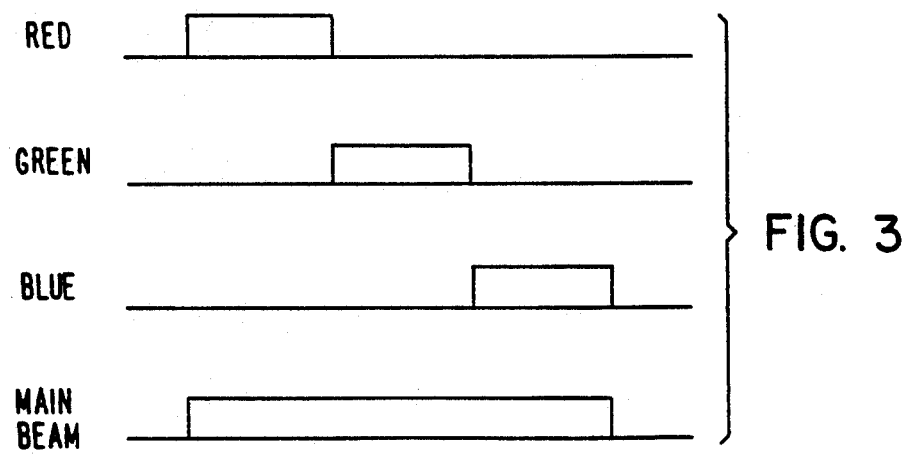
FIG. 3 is a timing chart showing timing of the beams converging at the pixel location in FIG. 2.

The four beams arrive with the following angles located between them. The angles are dependent on frequency of the source. If a different frequency source is used, the angles will vary in a known relationship. The angles are therefore related to beam wavelength or frequency. A 45° angle is inscribed between the beam pathways 64 and 80. The pathways 80 and 88 inscribe a 9° angle while the remaining angel is 6°. Thus, between the beams 64 and 72, the total angle is 60°. The beam paths 72 and 80 are 15° from one another. It is understood that two coherent light beams converging on a single pixel location form interference fringes. This enables the formation of rulings on the blank at 50. In this instance, however, there are four beams converging at the pixel 50. While the convergence of two beams might provide a relatively simple, approximately triangular ruling (viewed at a sectional line) on the grating so formed, the other beams modify this so that the grating is different. This completely changes the mode of dispersion of ambient light, and assists in providing depth to the hologram. A 3-D effect is accomplished by this approach. This can be understood better with the timing chart of FIG. 3. In FIG. 3, assume that the main beam is on for 100 units of time. In that instance, the three primary colors are divided into one third of that interval and they are each on for a maximum of 33 time units (rounding the number). The shutters for the red beam, the green beam and the blue beam are divided into 33 units and are operated accordingly. The drive motors open the shutters for this interval. Assume that the photoresist responds at a controlled rate relative to beam intensity so that it takes one second to form the gratings. In that instance, the three primary colors are switched on for a maximum of 0.33 seconds each. These are maximum exposures; each primary color is modulated. If the color purple is to be encoded in the pixel, then the red and blue intervals are equal. That interval, however, may depend on color intensity. The blue and red shutters are held open for equal intervals up to 33 time units. In sum, the blank is irradiated by the four beams which come together at the pixel 50 and the pixel then encodes the color mix. The color mix is encoded in the sense that the interference fringes are different due to the different direction of travel for the primary colors. This causes the completed interference fringes in the photoresist blank to take different shapes in the grating formed on the photosensitive blank and therefore enable color differences to be transmitted from the pixel 50. Again, the three beams are described as the red beam, the green beam, and the blue beam, but they are not colored, remaining simply laser beam portions which are coherent and traveling along equal length pathways.

From the foregoing it will be understood how the several data words which describe an individual pixel are used to form that pixel in the blank 50. The image can be scaled up or down in size, and the relative fineness of the completed hologram is determined in part by pixel spacing and pixel diameter. Moreover, the intensity of the beam in conjunction with the rate of response to the beam assures that suitable intensity can be obtained from the method of converting a single pixel into interference fringes for forming the hologram. The hologram shape is determined by the image 10, and the color of the image is preserved in the foregoing fashion. This converts the photosensitive (e.g., photoresist) blank 36 into a master. The master is developed, e.g., can be cured and hardened prior to use to form a plurality of duplicate pressings. The converted blank thus becomes a fracting surface, able to form a 3-D image when exposed to light, an image having depth and capable of rotation to alter perspective. The memory can be stored indefinitely and can be used later and can also be used with various scale factors incorporated at the CPU 30. The CPU can be also used to accomplish other image processing changes. For instance, a color bias can be encoded simply by changing all of the primary color digital words in a selected fashion. Color mix can be changed as well as color intensity by incorporating the bias mentioned above. CPU input of the bias is easily accomplished.

Typically, in the practice of the method of the present disclosure, the image is mounted on the surface which has a fixed, neutral background. For instance, the background can be a single tone or color. The image can be one or several colors to provide contrast. During scanning, the point or pixel being encoded is moved from point to point across the fixed background color. Since the color is fixed, scanning can proceed more rapidly (at an increased rate) until the image is encountered, and the speed can then be decreased to permit more time for variable encoding.

The process of the present invention is described above in relation to the equipment which is shown in the drawings. The process is useful with a variety of types of lasers including lasers operative at various frequencies in visible and nonvisible light spectra. Other variations in the mode of operation can be used. The scope thereof is determined by the claims which follow.

What is claimed is:

1. A method of converting an image into a hologram corresponding to said image comprising the steps of:
    (a) defining an organized set of pixels in an X and Y coordinate system to encompass an image wherein the image is encoded as digital words defining said set of pixels constituting said image, said step of defining including the sub-steps of:
        (1) representing each pixel location as X and Y coordinate values encoded as two digital words;
        (2) encoding a pixel optical density value for each pixel on a scale between black and white as a digital word;
        (3) encoding pixel color values for each pixel as up to three digital words based on three primary colors;
    wherein each of said pixels is defined by up to six digital words;
    (b) storing in a memory said digital words;
    (c) directing a laser beam onto a photosensitive surface in a sequence corresponding to said digital words representing said image to react with said photosensitive surface, said step of directing including the sub-steps of:
        (1) splitting the laser beam into four parts;
        (2) directing a first part of the laser beam to the photosensitive surface along a first pathway as a reference beam;
        (3) directing the second, third and fourth parts of the laser beam along second, third and fourth pathways, each of equal length to said first pathway;
    wherein the second, third and fourth beam parts respectively are coincident with the first beam part on the photosensitive surface at different times for a selected pixel and at different angles with respect to the photosensitive surface for said selected pixel;
    (d) modulating the four parts of said laser beam in accordance with the digital words corresponding to said selected pixel, said step of modulating including the sub-steps of:
        (1) modulating the first beam part based on at least one of said digital words corresponding to said selected pixel; and
        (2) separately modulating the second, third and fourth beam parts based on said three primary colors expressed as up to four of said digital words so that said second, third and fourth beam parts respectively are coincident on the photosensitive surface with said reference beam at different times for said selected pixel;
    (e) serially moving said photosensitive surface so as to redirect the laser beam to pixel locations successive to said selected pixel on the photosensitive surface in correspondence to said X and Y coordinate values representing pixel location;
    (f) repeating steps (c)-(e) for each successive pixel location so that a pattern is irradiated corresponding to said image; and
    (g) developing said photosensitive surface to form a hologram.

2. The method of claim 1 wherein step (d)(1) is carried out based upon the digital word containing the encoded optical density of said selected pixel.

3. The method of claim 1 wherein step (a) includes the step of placing an image of a photograph or other artwork on a scanner surface, and an optical scanner is moved across the scanner surface to the pixel locations defined in the X and Y coordinate system wherein said scanner forms digital words representing scanned pixels at the pixel locations defined in the X and Y coordinate system.

4. The method of claim 3 wherein said image and said optical scanner are relatively incremented in a controlled pattern to form encoded X and Y position digital signals, said method further including the step of correlating encoded X and Y position digital signals with said digital words.

5. The method of claim 1 wherein step (a) includes directing an optical scanner to each pixel location of the image and measuring primary color content at each pixel location.

6. The method of claim 1 wherein step (a) includes the step of measuring said pixel optical density value on a scale between black and white.

7. The method of claim 1 wherein step (a) includes moving a scanner to measure each subsequent pixel and scanner position is incremented by a specific distance defining a minimal pixel spacing for the image.

8. The method of claim 1 wherein step (b) includes storing said digital words in memory in a controlling sequence relating to the image scanning sequence.

9. The method of claim 1 wherein step (a) includes the step of optically measuring each pixel of the image to determine the diameter of each pixel.

10. The method of claim 1 wherein step (a) includes the step of measuring optical density on a gray scale, and also measuring optical density of three primary color components of each pixel.

11. A hologram resulting from the method of claim 1.

12. A method of converting an image into a hologram corresponding to said image comprising the steps of:
 (a) defining an organized set of pixels in an X and Y coordinate system to encompass an image wherein the image is encoded as digital words defining said set of pixels constituting said image, said step of defining including the sub-steps of:
  (1) representing each pixel location as X and Y coordinate values encoded as two digital words;
  (2) encoding a pixel optical density value for each pixel on a scale between black and white as a digital word;
  (3) encoding pixel color values for each pixel as a plurality of digital words based on a predetermined plurality of colors;
 wherein each of said pixels is defined by a plurality of digital words;
 (b) storing in a memory said digital words;
 (c) directing a laser beam onto a photosensitive surface in a sequence corresponding to said digital words representing said image to react with said photosensitive surface, said step of directing including the sub-steps of:
  (1) splitting the laser beam into a first beam part and a plurality of other beam parts;
  (2) directing said first beam part to the photosensitive surface along a first pathway as a reference beam;
  (3) directing each of the other beam parts along respective different pathways, each of equal length to said first pathway;

wherein said other beam parts respectively are coincident with the first beam part on the photosensitive surface at different times for a selected pixel at different angles with respect to the photosensitive surface for said selected pixel;
 (d) modulating the other beam parts of said laser beam in accordance with the digital words corresponding to said selected pixel, said step of modulating including the sub-steps of:
  (1) modulating the first beam part based on at least one of said digital words corresponding to said selected pixel; and
  (2) separately modulating the other beam parts based on said plurality of predetermined colors expressed as a plurality of said digital words so that said other beam parts respectively are coincident on the photosensitive surface with said reference beam at different times for said selected pixel;
 (e) serially moving said photosensitive surface so as to redirect the laser beam to pixel locations successive to said selected pixel on the photosensitive surface in correspondence to said X and Y coordinate values representing pixel location;
 (f) repeating steps (c)-(e) for each successive pixel location so that a pattern is irradiated corresponding to said image; and
 (g) developing said photosensitive surface to form a hologram.

13. The method of claim 12 wherein step (a) includes the step of optically measuring the optical density of each pixel in the image.

14. The method of claim 12 wherein step (a) includes directing an optical scanner to each pixel location of the image and measuring primary color content at each pixel location to form digital words encompassing said color content, wherein the laser beam parts corresponding to pixel color data are defined by said digital words encompassing said color content.

15. The method of claim 12 wherein step (a) moving a scanner to measure each subsequent pixel, scanner piston being incremented by a specific distance defining a minimal pixel spacing for the image.

16. A method of converting an image into a hologram corresponding to said image comprising the steps of:
 (a) defining an organized set of pixels in an X and Y coordinate system to encompass an image wherein the image is encoded as digital words defining said set of pixels constituting said image, said step of defining including the sub-steps of:
  (1) representing each pixel location as X and Y coordinate values encoded as two digital words;
  (2) encoding a pixel optical density value for each pixel on a scale between black and white as a digital word;
  (3) encoding pixel color values for each pixel as a plurality of digital words based on a predetermined plurality of colors;
 wherein each of said pixels is defined by a plurality of digital words;
 (b) storing in a memory said digital words;
 (c) directing a laser beam onto a photosensitive surface in a sequence corresponding to said digital words representing said image to react with said photosensitive surface, said step of directing including the sub-steps of:
  (1) splitting the laser beam into a first beam part and a plurality of other beam parts;

(2) directing said first beam part to the photosensitive surface along a first pathway as a reference beam;

(3) directing each of the other beam parts along respective different pathways, each of equal length to said first pathway;

wherein said other beam parts are coincident with the first beam part on the photosensitive surface in a predetermined time sequence for a selected pixel and at different angles with respect to the photosensitive surface for said selected pixel;

(d) modulating the other beam parts of said laser beam in accordance with the digital words corresponding to said pixel, said step of modulating including the sub-steps of:

(1) modulating the first beam part based on at least one of said digital words corresponding to said selected pixel; and (2) separately modulating the other beam parts based on said plurality of predetermined colors expressed as a plurality of said digital words so that said other beam parts are coincident on the photosensitive surface with said reference beam in a predetermined timed sequence for said selected pixel;

(e) serially moving said photosensitive surface so as to redirect the laser beam to pixel locations successive to said selected pixel on the photosensitive surface in correspondence to said X and Y coordinate values representing pixel location;

(f) repeating steps (c)–(e) for each successive pixel location so that a pattern is irradiated corresponding to said image; and (g) developing said photosensitive surface to form a hologram.

17. The method of claim 16 wherein step (a) includes directing an optical scanner to each pixel location of the image and measuring primary color components at each pixel location.

18. The method of claim 16 wherein step (a) includes moving a scanner to measure each subsequent pixel, and scanner position is incremented by a specific distance defining a minimal pixel spacing for the image.

* * * * *